May 2, 1950     M. STRANAK     2,505,922
ARTIFICIAL CASTING BAIT
Filed July 9, 1946
FIG. 1.
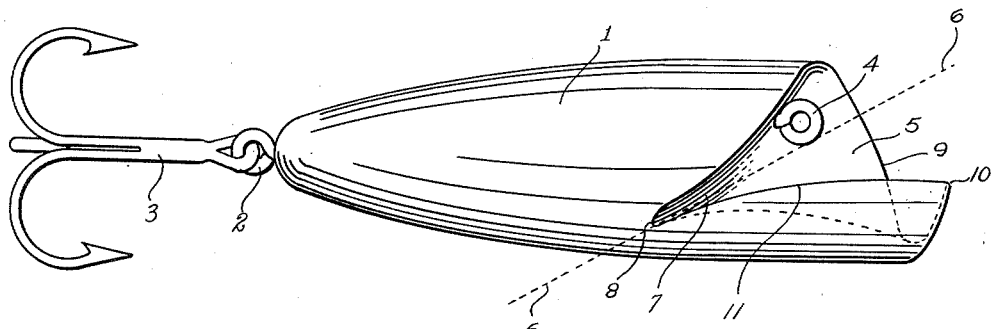
FIG. 2.
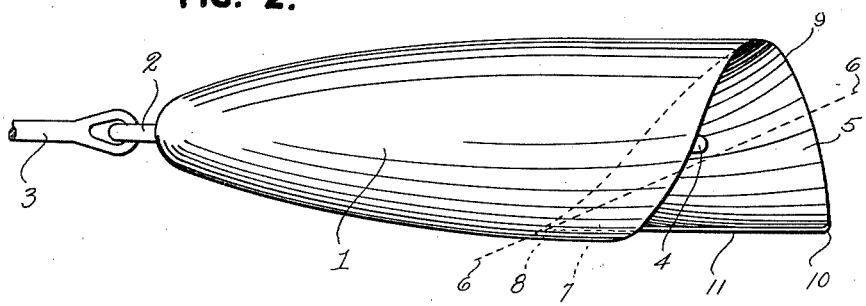
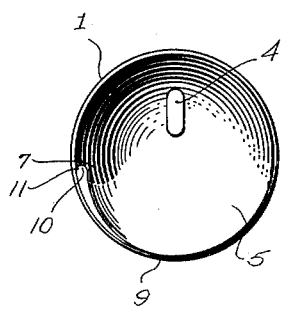
FIG. 3.
INVENTOR.
MICHAEL STRANAK,
BY
ATTORNEYS.

Patented May 2, 1950

2,505,922

UNITED STATES PATENT OFFICE 2,505,922

ARTIFICIAL CASTING BAIT

Michael Stranak, Murray, Ky.

Application July 9, 1946, Serial No. 682,225

2 Claims. (Cl. 43—42.48)

This invention relates to an artificial casting bait, and more particularly, to an artificial bait having action in the water resembling that of a live minnow.

It has long been recognized that a wounded minnow struggling in the water is very alluring to game fish. The efficiency of such bait has never been questioned. However, since such live bait is not always available, fishermen have long been striving to devise an artificial bait that would be just as alluring and attractive to game fish. Many artificial baits have been devised and though some of these baits will simulate part of the action of a wounded minnow, none will simulate all the numerous actions of a live minnow. It is therefore a major object of this invention to provide an artificial casting bait, simple in structure, and having features to simulate all the numerous actions of a live minnow.

Another object of this invention is to provide an improved artificial casting bait having structure causing the bait to resemble a live minnow in various actions, such as swimming, darting to the left, then to the right, ducking down, and breaking the water with a popping sound.

It is a further object of this invention to provide an improved artificial bait which may be used for casting or trolling and which is provided with a depression at its forward end and which depression is spirally formed.

It is still another object of this invention to provide an improved artificial bait of circular cross-section and of substantially conical shape and in which the forward end is provided with a funnel-shaped depression having a spirally arranged surface.

Still a further object of this invention is to provide an improved artificial bait of circular cross-section and tapering contours, and in which a depression forms the head of the bait, and in which the depression is spirally cut about an axis making an angle with the axis of the bait, so that the depression has an outlet at the side of the bait.

Other objects and advantages of this invention will appear from the following specification and claims and from the accompanying drawing illustrating the invention, wherein:

Figure 1 is a side elevational view of the artificial bait of this invention;

Figure 2 is a plan view of the artificial bait; and

Figure 3 is a front elevational view, showing the head end of the artificial bait.

Referring to the drawings, the numeral 1 denotes generally the body of the artificial bait, which body is preferably made of wood, although other materials, such as metal or plastic, may also be used for the body 1. As shown, the body is preferably of circular cross-section and gradually tapers from a wide cross-section at the forward end to a small cross-section at the rear end. The taper is preferably such that the outer surface of the body 1 curves slightly in a longitudinal direction. It is, of course, within the scope of this invention to utilize body shapes other than that described above.

To the rear end of the body 1, there is suitably secured an eye-piece 2, to which is swiveled a conventional hook means 3. At the forward end of the body 1, there is also suitably secured an eye piece 4 to which a conventional fishing line (not shown) may be attached.

The front end of the body 1 is provided with a funnel-shaped depression 5, as illustrated in the figures. The depression 5 is formed by spirally cutting out the forward end of the body 1 substantially about the axis 6 shown in dotted lines in Figures 1 and 2. Axis 6 passes through the side of the body 1 and makes an angle with the longitudinal axis of body 1. Thus in forming the cut-out about the axis 6 in a spiral manner, an opening or slot 7 will be formed in the side of the body 1, as illustrated. The apex 8 of the opening 7 will substantially coincide with the axis 6 where it passes through the side of the body 1. When formed, the depression 5 will have an outer edge portion 9, which commencing from point 10 will spiral about axis 6, approaching close thereto, until the edge 9 reaches the point 8. The outer edge portion 11, between points 8 and 10, is slightly curved as shown, to complete the outer edge of the depression 5 and form the slot 7 with edge portion 9. The surface of the depression 5 is preferably slightly curved, convex toward the axis 6, as illustrated by the curve of edge portion 11. In effect the surface of depression 5 is formed by revolving the curved line 11, with point 8 substantially fixed, spirally about the axis 6.

In operation, as the body 1 is drawn through the water, the water will, in effect, impinge against the surface of the depression 5 and will be directed down into the funnel-shaped depression and will be discharged through slot 7 to one side of the body 1. Because of the special shape of the depression 5 and the lateral discharge of the water therefrom, it is evident that the body 1 will not move through the water in a straight and uniform manner. Instead the body 1 will rotate and wiggle as the depression 5 catches the water and discharges it laterally. The force of the water against the surface of depression 5 will cause the body 1 to assume irregular movements very similar to the movements of a live wounded minnow struggling in the water. As the body 1 turns, the slot 7 will first be on the left side and then on the right side and thus the body 1 will dart to the left and then to the right. Similarly when the slot 7 is on top, the body will tend to move downwardly and when the slot 7 is on the bottom the body will move upwardly. Thus the artificial bait of this invention will simulate a wounded minnow swimming first in one direction, then in another. The bait when moving upwardly will break the water with a popping sound and thus every action of a wounded minnow will be simulated.

While a certain specific embodiment of this invention has been shown, it will be understood that various modifications may be made within the spirit of the invention. Therefore no limitations on the invention are intended other than are imposed by the scope of the appended claims.

I claim:

1. An artificial minnow comprising an elongated body of substantially circular cross section tapering toward its rear end, a hook secured to said rear end, the forward part of said body being formed with a conical recess substantially as large as the cross section of said body with its larger end opening forwardly through the forward end of said body, and a fishing line attaching eye secured to said body within said recess, the side of said body being provided with a longitudinal slot communicating with said conical recess, said slot flaring in width toward said conical recess, the recess being in the form of a spiral and extending longitudinally and at an acute angle to the longitudinal axis of said body.

2. An artificial minnow comprising an elongated body of substantially circular cross section tapering toward its rear end, a hook secured to said rear end, the forward part of said body being formed with a conical recess substantially as large as the cross section of said body with its larger end opening forwardly through the forward end of said body, and a fishing line attaching eye secured to said body within said recess, the side of said body being provided with a longitudinal slot communicating with said conical recess, said slot flaring in width toward said conical recess, the recess being in the form of a spiral and extending longitudinally and at an acute angle to the longitudinal axis of said body, the longitudinal axis of said slot being substantially coaxial with the longitudinal axis of said spiral recess.

MICHAEL STRANAK.

REFERENCES CITED

The following references are of record in the file of this patent:

UNITED STATES PATENTS

| Number | Name | Date |
|---|---|---|
| D. 147,101 | Adams et al. | July 15, 1947 |
| 1,153,473 | Wilson | Sept. 14, 1915 |
| 1,338,953 | Odell | May 4, 1920 |
| 1,609,855 | Bayer | Dec. 7, 1926 |
| 1,710,908 | Vereecken | Apr. 30, 1929 |
| 1,725,636 | Heaslip | Aug. 20, 1929 |
| 1,801,940 | Stanley | Apr. 21, 1931 |
| 2,159,591 | Leusch et al. | May 23, 1939 |